United States Patent [19]
Holycross

[11] 3,839,926
[45] Oct. 8, 1974

[54] MACHINE FOR SHARPENING CIRCULAR SAWS

[76] Inventor: Reginald R. Holycross, P.O. Box 855, Goldendale, Wash. 98620

[22] Filed: Apr. 16, 1973

[21] Appl. No.: 351,711

[52] U.S. Cl............................. 76/37, 76/40, 76/73
[51] Int. Cl..................... B23d 63/12, B23d 63/04
[58] Field of Search............... 76/37, 40, 41, 43, 42, 76/73

[56] References Cited
UNITED STATES PATENTS

| 89,006 | 4/1869 | Bartlett | 76/43 |
| 987,466 | 3/1911 | Jensen | 76/37 |
| 2,135,891 | 11/1935 | Gommel | 76/73 |
| 2,811,873 | 11/1957 | Nielsen | 76/40 |
| 2,811,874 | 11/1957 | Rethoret | 76/40 |
| 3,139,774 | 7/1964 | Sipinen et al. | 76/40 |

Primary Examiner—Harrison L. Hinson
Attorney, Agent, or Firm—Robert K. Rhea

[57] ABSTRACT

A frame including an angularly upward disposed base plate is supported on a horizontal surface by laterally projecting frame legs connected with the base plate. An arbor, connected with one face of the base plate, journals a grinding wheel which is belt driven by a motor mounted on the opposite face of the base plate. Guard members, connected with the frame legs and base plate, shield peripheral portions of the grinding wheel and a guide bar connected with the frame legs, support a workman's hands when gripping a circular saw to be sharpened.

2 Claims, 3 Drawing Figures

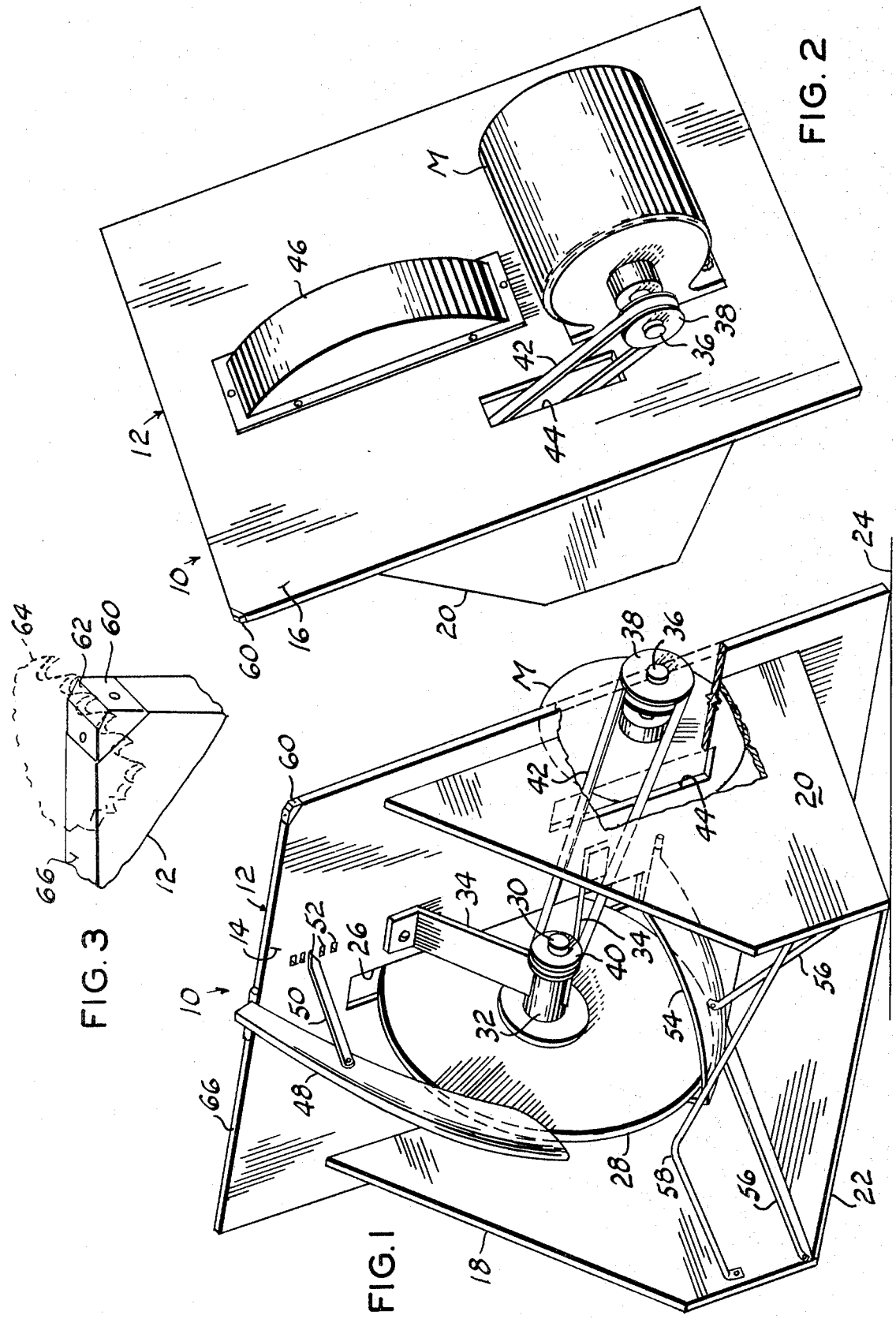

MACHINE FOR SHARPENING CIRCULAR SAWS

BACKGROUND OF THE INVENTION

1. Field of the Invention

The present invention relates to saws and more particularly to a lightweight portable machine for sharpening circular saws.

2. Description of the Prior Art

Most saw sharpening machines are relatively bulky in structure and are relatively expensive, such as disclosed by U.S. Pat. Nos. 2,410,274 and 2,517,873. These patents disclose machines which more or less automatically sharpens the teeth of a circular saw when connected therewith and are satisfactory where needed for providing saw sharpening services for a plurality of owners of circular saws to be sharpened.

This invention is distinctive over these patents by its relative simplicity of construction and light weight whereby it may be easily moved manually from one location to another and is readily available for sharpening the teeth of circular saws when they become dull rather than the owner of the circular saws being deprived of the use thereof while awaiting the saws to be sharpened and returned from a saw sharpening service center.

SUMMARY OF THE INVENTION

A grinding wheel is rotatably supported by a frame comprising a base plate angularly disposed upwardly on a horizontal surface and supported by a pair of frame legs having guide means for supporting the hands of a user holding a circular saw being sharpened. The grinding wheel is driven by belt and pulley means connected with a motor mounted on the surface of the base plate opposite the grinding wheel. Means are provided on the base plate for setting the teeth of the circular saw prior to the sharpening action.

The principle object of this invention is to provide a relatively lightweight portable machine for sharpening circular saws adjacent the location where the saws are being used.

BRIEF DESCRIPTION OF THE DRAWINGS

FIG. 1 is a perspective view of the device in operative position with parts broken away for clarity;

FIG. 2 is a perspective view of the rearward side of the device as shown by FIG. 1; and, FIG. 3 is a fragmentary perspective view illustrating the circular saw tooth setting feature of the base, a fragment of a circular saw being shown by dotted lines.

DESCRIPTION OF THE PREFERRED EMBODIMENT

Like characters of reference designate like parts in those figures of the drawings in which they occur.

In the drawings:

The reference numeral 10 indicates the saw sharpening device, as a whole, which includes an upstanding rectangular plate-like base 12 having a forward surface or face 14 and a rearward surface or face 16. A pair of frame leg forming plates 18 and 20 are connected by one edge portion the front 14 of the base 12 in right angular spaced-apart parallel relation adjacent the respective marginal side edge surface of the base intermediate the length of the base. The plates 18 and 20 are interconnected adjacent the depending limit of the base by a panel 22. The plates 18 and 20 and panel 22 thus form a substantially U-shaped bracket connected with the base 12 which supports the base 12 on a horizontal surface 24, such as a table, or the like, with the base inclined upwardly and forwardly. Adjacent its upper end and medially its width the base is provided with a rectangular slot 26 which loosely receives an arc of a grinding wheel 28. An arbor 30 journaled by a bearing 32 is coaxially connected with the grinding wheel 28. The bearing is supported on the base by a pair of legs 34 secured to the forward face 14 of the base adjacent the slot 26.

A motor M is mounted on the rearward face 16 of the base adjacent its depending end. The motor M is provided with a drive shaft 36 having a drive pulley 38. A driven pulley 40 is secured to the arbor 30 in aligned relation with the motor drive pulley 38 for receiving a V-belt 42, or the like, which extends through a belt slot 44 formed in the base.

A saw guard 46 is secured to the rearward face 16 of the base to shield that portion of the grinding wheel 28 projecting through the base.

An elongated spark deflector guard 48, U-shaped in cross section, is hingedly secured at one end to the upwardly directed edge of the base 12 and adjustably supported by an arm 50 pivotally connected at one end with the guard 48 and removably received at its other end within a selected one of a plurality of recesses 52 formed in the forward face 14 of the base. Similarly, an emery dust collector guard 54 surrounds a depending arc portion of the grinding wheel 28 and is secured to the forward face 14 of the base and rigidly supported by brace rods 56 connected with the respective plate 18 and 20. A saw tooth sharpening guide bar 58, substantially widened inverted V-shape in general configuration, extends between and is secured to the plates 18 and 20 with the apex of its V-shape disposed near the path of travel of the periphery of the grinding wheel.

As illustrated in FIG. 3, a saw tooth setting guide 60 is secured to one corner portion of the base 12 and is provided with a flat surface 62 formed in angular relation with respect to the plane of the adjacent edge surface of the base with the angular inclination determined by the desired degree of off-set to be imparted to the teeth of a circular saw to obtain a desired "set" for the saw teeth. The saw tooth set guide 60 is used by placing a circular saw 64 flatly upon one marginal surface of the base, for example the edge surface 66, so that one or more of the saw teeth overlie the angular surface 62. The saw blade is then manually held flatly on the surface 66 and and a small hammer, or the like, not shown, is used to strike every other tooth of the saw in succession as the saw teeth are successively disposed over the surface 62 to bend the struck teeth laterally of the plane of the saw into contact with the surface 62. The position of the saw is then reversed or turned over, and the previously skipped teeth of the saw are then bent into contact with the angular surface 62. The saw blade 64 is then manually grasped and individual teeth held in contact with the grinding wheel 28, being driven by the motor M. The guide bar 58 supports the user's hands to maintain a desired position of the saw during grinding action on each tooth as the saw teeth are sharpened.

Obviously the invention is susceptible to changes or alterations without defeating its practicability, therefore, I do not wish to be confined to the preferred embodiment shown in the drawings and described herein.

I claim:

1. A circular saw sharpener, comprising: a planar base having at least one opening therethrough; an arbor mounted on one surface of said base; a motor mounted on the opposite surface of said base; belt and pulley means drivably connecting said motor with said arbor through the opening in said base; a grinding wheel secured to said arbor; and, circular saw guide means supporting said base on an incline with respect to a horizontal support surface, said guide means including, a pair of plates secured to said base in parallel spaced relation on opposing sides of said grinding wheel, and, an inverted substantially V-shaped guide bar connected with and extending between said pair of plates with the apex of said V-shape being disposed adjacent the perimeter of said grinding wheel whereby the legs of the V-shaped guide bar support the hands of a workman holding a circular saw to be sharpened in contact with said grinding wheel.

2. The saw sharpener according to claim 1 in which said guide means further includes:

a panel extending between and secured to said plates at their depending base supporting ends; and, guard means secured to said base and shielding a peripheral portion of said grinding wheel.

* * * * *